United States Patent
Panz et al.

(10) Patent No.: US 8,617,504 B2
(45) Date of Patent: *Dec. 31, 2013

(54) HYDROPHILIC SILICA FOR SEALANTS

(75) Inventors: Christian Panz, Wesseling-Berzdorf (DE); Helga Obladen, Bruehl (DE); Rene Allerdisse, Bornheim (DE); Karl Meier, Alfter (DE); Markus Ruf, Alfter-Witterschlick (DE); Michael Kempf, Rodenbach (DE); Mario Scholz, Gruendau (DE); Dieter Kuhn, Rodenbach (DE)

(73) Assignee: Evonik Degussa GmbH, Essen (DE)

( * ) Notice: Subject to any disclaimer, the term of this patent is extended or adjusted under 35 U.S.C. 154(b) by 1570 days.

This patent is subject to a terminal disclaimer.

(21) Appl. No.: 11/754,915

(22) Filed: May 29, 2007

(65) Prior Publication Data

US 2007/0299203 A1   Dec. 27, 2007

(30) Foreign Application Priority Data

May 26, 2006   (DE) .......................... 10 2006 024 590

(51) Int. Cl.
*C01B 33/12* (2006.01)

(52) U.S. Cl.
USPC ........... 423/335; 423/339; 524/492; 524/493; 524/588; 424/49

(58) Field of Classification Search
None
See application file for complete search history.

(56) References Cited

U.S. PATENT DOCUMENTS

| | | | |
|---|---|---|---|
| 4,681,750 A | 7/1987 | Johnson et al. | |
| 4,704,425 A * | 11/1987 | Lagarde et al. | 524/492 |
| 4,711,928 A * | 12/1987 | Lee et al. | 524/860 |
| 5,256,196 A | 10/1993 | Chjonowski et al. | |
| 5,321,070 A | 6/1994 | Meier et al. | |
| 5,851,502 A | 12/1998 | Turk et al. | |
| 6,077,466 A | 6/2000 | Turk et al. | |
| 6,191,122 B1 | 2/2001 | Lux et al. | |
| 6,846,865 B2 | 1/2005 | Panz et al. | |
| 6,899,951 B2 | 5/2005 | Panz et al. | |
| 6,956,080 B2 | 10/2005 | Scholz et al. | |
| 7,022,375 B2 | 4/2006 | Schachtely et al. | |
| 7,070,749 B2 | 7/2006 | Lindner et al. | |
| 7,074,457 B2 | 7/2006 | Panz et al. | |

(Continued)

FOREIGN PATENT DOCUMENTS

DE   26 10 207 A1   9/1976
DE   27 29 244 A1   1/1979

(Continued)

OTHER PUBLICATIONS

U.S. Appl. No. 12/262,684, filed Oct. 31, 2008, Panz, et al.

(Continued)

*Primary Examiner* — Melvin C Mayes
*Assistant Examiner* — Smita Patel
(74) *Attorney, Agent, or Firm* — Oblon, Spivak, McClelland, Maier & Neustadt, L.L.P.

(57) ABSTRACT

Hydrophilic precipitated silicas which combine a particularly low initial moisture content with low moisture absorption over time, a low tapped density and a low silanol group density, have the following physicochemical parameters: equilibrium moisture content (at 70% relative humidity/20° C.) of 0.5%-5.0% by weight, based on the weight of the hydrophilic precipitated silica, BET surface area of 50-250 $m^2/g$, CTAB surface area of 50-250 $m^2/g$, and DBP (anhydrous) of 200-350 g/100 g.

23 Claims, 2 Drawing Sheets

Standard dumbbell

| | Standard dumbbell | | | |
|---|---|---|---|---|
| | S1 | S2 | S3 | S3A |
| Total length, minimum l | 115 | 75 | 35 | 50 |
| Width of ends $B_K$ | 25 | 12.5 | 6 | 8.5 |
| Length of bridge $l_S$ | 33 | 25 | 12 | 15 |
| Width of bridge ± 0.05 | 6 | 4 | 2 | 4 |
| Transition radius, internal $r_1$ | 25 | 12.5 | 2.2 | 0 |
| Transition radius, external $r_2$ | 14 | 8 | 2.2 | 10 |
| Thickness a | 1.5 to 3.0 | 1.5 to 3.0 | 1.5 to 3.0 | 1.5 to 3.0 |
| Preferred dimensions | 2.0 | 2.0 | 1.0 | 2.0 |
| Measurement length $L_0$ | 25 | 20 | 10 | 10 |

(56) References Cited

U.S. PATENT DOCUMENTS

| | | |
|---|---|---|
| 7,097,818 B2 | 8/2006 | Lindner et al. |
| 7,204,969 B2 | 4/2007 | Kuhlmann et al. |
| 7,220,449 B2 | 5/2007 | Schachtely et al. |
| 7,799,304 B2 * | 9/2010 | Dromard et al. ............ 423/339 |
| 7,871,588 B2 | 1/2011 | Lindner et al. |
| 2003/0162881 A1 * | 8/2003 | Panz et al. .................... 524/493 |
| 2005/0191228 A1 * | 9/2005 | Panz et al. .................... 423/335 |
| 2005/0192395 A1 | 9/2005 | Panz et al. |
| 2005/0282934 A1 | 12/2005 | Brinkmann et al. |
| 2008/0173739 A1 | 7/2008 | Meier et al. |
| 2011/0037021 A1 | 2/2011 | Tschernjaew et al. |
| 2011/0078920 A1 | 4/2011 | Tschernjaew et al. |
| 2011/0179970 A1 | 7/2011 | Zschunke et al. |
| 2011/0236288 A1 | 9/2011 | Panz et al. |
| 2011/0244238 A1 | 10/2011 | Panz et al. |

FOREIGN PATENT DOCUMENTS

| | | | |
|---|---|---|---|
| EP | 1 561 727 A1 | 8/2005 | |
| EP | 1 561 728 A1 | 8/2005 | |
| JP | 63-285113 A | 11/1988 | |
| JP | 1-256573 A | 10/1989 | |
| JP | 1-298014 A | 12/1989 | |
| JP | 6-1606 | 1/1994 | |
| WO | WO 2005/061384 A2 | 7/2005 | |
| WO | WO 2005061384 A2 * | 7/2005 | ............ C01B 33/193 |

OTHER PUBLICATIONS

U.S. Appl. No. 11/944,851, filed Nov. 26, 2007, Panz, et al.
U.S. Appl. No. 60/021,601, filed Jul. 11, 1996, Oelmueller, et al.
U.S. Appl. No. 09/447,044, filed Nov. 23, 1999, Turk, et al.
U.S. Appl. No. 08/683,342, filed Jul. 18, 1996, Rausch, et al.
U.S. Appl. No. 60/940,615, filed May 29, 2007, Meier, et al.
U.S. Appl. No. 60/985,809, filed Nov. 6, 2007, Panz, et al.
Office Action issued Sep. 14, 2012 in Japanese Patent Application No. 2007-140408 (German translation only).
U.S. Appl. No. 13/202,512, filed Aug. 19, 2011, Stenner, et al.
U.S. Appl. No. 13/263,110, filed Oct. 6, 2011, Linder, et al.

* cited by examiner

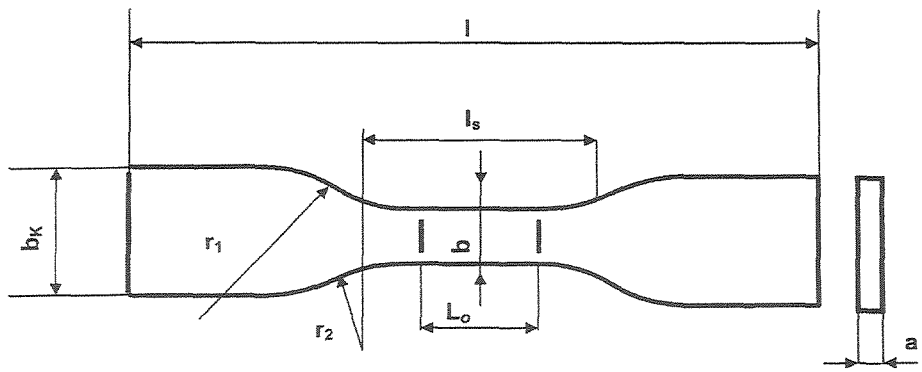
Standard dumbbell
|  | Standard dumbbell | | | |
| --- | --- | --- | --- | --- |
|  | S1 | S2 | S3 | S3A |
| Total length, minimum $l$ | 115 | 75 | 35 | 50 |
| Width of ends $B_K$ | 25 | 12.5 | 6 | 8.5 |
| Length of bridge $l_S$ | 33 | 25 | 12 | 15 |
| Width of bridge $\pm$ 0.05 | 6 | 4 | 2 | 4 |
| Transition radius, internal $r_1$ | 25 | 12.5 | 2.2 | 0 |
| Transition radius, external $r_2$ | 14 | 8 | 2.2 | 10 |
| Thickness a | 1.5 to 3.0 | 1.5 to 3.0 | 1.5 to 3.0 | 1.5 to 3.0 |
| Preferred dimensions | 2.0 | 2.0 | 1.0 | 2.0 |
| Measurement length $L_0$ | 25 | 20 | 10 | 10 |
Figure 1: Shape and dimensions of standard dumbbells used

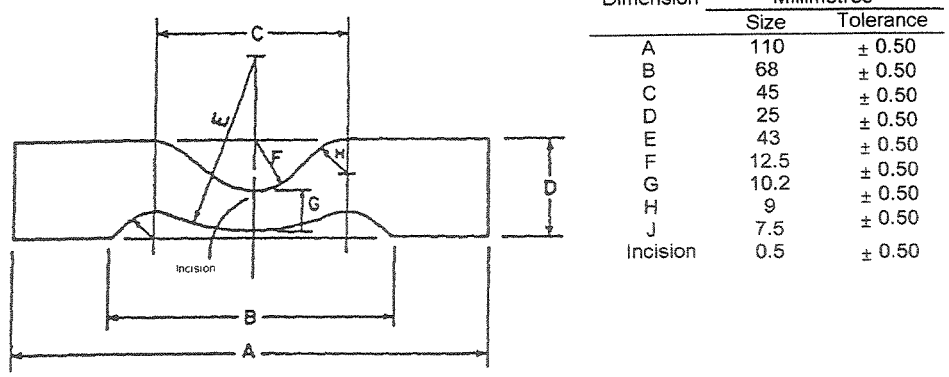
Figure 2: Shape and dimensions of test specimens

HYDROPHILIC SILICA FOR SEALANTS

BACKGROUND OF THE INVENTION

1. Field of the Invention

The present invention relates to hydrophilic precipitated silicas that are especially suitable for use in RTV-1K sealants, to a process for preparing them and to their use for thickening sealants.

2. Discussion of the Background

Sealants are elastic substances that are applied in liquid to highly viscous form for the sealing of buildings or installations against water, atmospheric influence or aggressive media.

Silicone rubbers are compositions which are convertible into the elastomeric state and comprise as their base polymers polydiorganosiloxanes containing groups amenable to crosslinking reactions. Suitable groups include, primarily H atoms, OH groups and vinyl groups, which may be located at the chain ends, or else may be incorporated in the chain. Incorporated into this system are fillers as reinforcers, their nature and amount significantly influencing the mechanical and chemical behavior of the vulcanizates. Silicone rubbers can be colored with inorganic pigments. One distinction is between high-temperature vulcanizing and room-temperature vulcanizing (HTV/RTV) silicone rubbers.

Among the room-temperature curing or vulcanizing silicone rubber compositions, it is possible to differentiate one-component (1K) and two-component (2K) systems. The first group (RTV-IK) polymerizes slowly at room temperature under the influence of atmospheric moisture, with crosslinking taking place through condensation of SiOH groups to form Si—O bonds. The SiOH groups are formed by hydrolysis of SiX groups of a species formed as an intermediate from a polymer with terminal OH groups and from what is called a crosslinker R—SiX$_3$ (e.g. =—O—CO—CH$_3$, —NHR). In two-component rubbers (RTV-2K) the crosslinkers used are, for example, mixtures of silicic esters (e.g. ethyl silicate) and organotin compounds, the crosslinking reaction that takes place being the formation of an Si O—Si bridge from =Si—OR and =Si—OH (—=methyl group; R=organic radical) by elimination of alcohol.

The thickeners used for RTV-1K silicone rubber include silicas. In view of the sensitivity to hydrolysis of the silicone sealants, these silicas must introduce as little moisture as possible into the system. For this reason, fumed silicas have been used almost exclusively to date for this application. Hydrophilic silicas have not been used to date, on account of their high moisture content.

U.S. Pat. No. 5,395,605 claims precipitated silicas with a water absorption (23° C. and 64% relative humidity) of less than 4% whose tapped densities are above 100 g/l. The silicas from U.S. Pat. No. 5,395,605, however, can be used only in HTV silicone rubber and in cable extrusion. They are unsuitable for use in RTV1 silicone rubber, since the tapped density is too high and hence the thickening (yield point) would come out at too low a level. The process of U.S. Pat. No. 5,395,605 has the disadvantage that the silicas have to undergo a very long thermal treatment at very high temperature. As a result, the process is of little economic interest. In addition, the temperature treatment of U.S. Pat. No. 5,395,605 causes hardening and baking of the silicas, thereby making it mandatory for the silicas to be ground after thermal treatment.

WO 2005061384 shows the preparation and use—including use in silicone rubber—of silicas which according to the claim have a water absorption of <6% and a DOP>300 ml/100 g. The silicas disclosed in the examples of WO 2005061384, however, all have a water absorption of between 5.7% and 5.9% and are therefore unsuitable for use in RTV-1K formulations. Accordingly, WO 2005061384 describes only their use in silicone rubber formulations for extrusion processes (HTV).

EP 1557446 describes exclusively HTV silicone rubber formulations. The silicas employed therein have a loss on drying of <4%. Data on the equilibrium moisture content of the silicas used after exposure to high atmospheric humidity (this should not be confused with the loss on drying) are as absent from EP 1557446 as indications that the silicas described therein can be used in RTV silicone rubber formulations. The formulations disclosed in EP 1557446 are used for producing insulating materials such as cable sheathing, for example.

In summary, therefore, it can be stated that the above patents do not disclose any hydrophilic precipitated silicas which meet the exacting requirements for use in RTV-1K silicone rubber. There is therefore a strong need for hydrophilic precipitated silicas of this kind that are suitable for RTV-1K applications.

SUMMARY OF THE INVENTION

It is an object of the present invention to provide precipitated silicas which are especially suitable as thickeners and reinforcers in elastomer mixtures, especially in RTV-1K silicone rubber formulations. A further aim is to provide a process for preparing the silicas of the present invention.

Further objects, not explicitly stated, will emerge from the overall context of the description, examples and claims.

This and other objects have been achieved by the present invention the first embodiment of which includes hydrophilic precipitated silica, having the following physicochemical parameters:

| | |
|---|---|
| Equilibrium moisture content (at 70% relative humidity/20° C.) | 0.5%-5.0% by weight, based on the weight of the hydrophilic precipitated silica, |
| BET surface area | 50-250 m$^2$/g, |
| CTAB surface area | 50-250 m$^2$/g, and |
| DBP (anhydrous) | 200-350 g/100 g. |

In another embodiment, the present invention provides a process for preparing hydrophilic silica as above, comprising:

A) reacting at least one silicate with at least one acidifier, to obtain a silica, B) filtering and washing the silica, to obtain a washed silica or filter cake, C) drying the washed silica or filter cake, to obtain a dried silica, and D) heat-treating the dried silica.

In another embodiment, the present invention provides hydrophilic precipitated silica, obtained by the process as above.

In another embodiment, the present invention provides a sealant, comprising: at least one hydrophilic precipitated silica as above.

In another embodiment, the present invention provides a method of preparing a sealant, comprising:

adding at least one hydrophilic precipitated silica as above to a sealant.

BRIEF DESCRIPTION OF DRAWINGS

FIG. 1 shows shape and dimensions of standard dumbbells.
FIG. 2 shows shape and dimensions of test specimen.

DETAILED DESCRIPTION OF THE INVENTION

Surprisingly it has been found that the object of the present invention is achieved by the silica of the present invention that is defined in greater detail in the description below and also in the claims and in the examples.

The present invention provides hydrophilic precipitated silica characterized by the following physicochemical parameters:

| | |
|---|---|
| Equilibrium moisture content (at 70% relative humidity (relative humidity)/20° C.) | 0.5%-5.0% by weight |
| BET surface area | 50-250 m$^2$/g |
| CTAB surface area | 50-250 m$^2$/g |
| DBP (anhydrous) | 200-350 g/100 g. |

The present invention also provides hydrophilic precipitated silica which in addition to the stated parameters, independently of one another, has one or more of the following physicochemical parameters:

| | |
|---|---|
| modified tapped density | ≤70 g/l |
| loss on ignition | 0.1%-3.0% by weight |
| loss on drying | 0.1%-3.0% by weight |
| pH | 4-9 |
| silanol group density | 0.5-3.5 SiOH/nm$^2$ |
| fraction of particles <1 µm in the volume-based particle distribution | 5% to 100% |
| d$_{90}$ value of the volume-based particle distribution | 0.01 to 10 µm. |

The present invention further provides a process for preparing the precipitated silicas of the present invention.

Additionally provided by the present invention is the use of the silicas of the present invention in sealants, especially in silicone rubber and silicone sealants and with particular preference in RTV-1K sealants. Application is possible in different crosslinking systems, e.g. acetoxy-crosslinking, alkoxy-crosslinking and oxime-crosslinking. These systems are employed, for example, in the building industry as joint-sealants, in the automotive industry as adhesives and sealants, and as coating materials for textile fabric, for example.

The present invention further provides sealants based on silicone rubber which comprises the silicas of the present invention, and their use.

The precipitated silicas of the present invention have the advantage, among others, that on account of their very low moisture absorption over time (i.e. equilibrium moisture content) and in part also on the basis of their low initial moisture content, expressed by the loss on drying, they ensure high storage stability of the silicone rubber when incorporated into silicone rubber compositions, especially those of the RTV-1K type. RTV-1K silicone rubber polymerizes slowly at room temperature under the influence of atmospheric moisture, the crosslinking taking place through condensation of SiOH groups with formation of Si—O bonds. The fillers used for reinforcing and thickening, such as silicas, must therefore not actively entrain (by means of the initial moisture content) moisture into the system, since otherwise the polymerization of the silicone rubber would commence prior to the actual processing. This effect can be increased further if the silicas even passively (through moisture absorption) introduce only a small amount of moisture into the system. With the silicas of the present invention, success has been achieved for the first time in preparing hydrophilic precipitated silicas having a sufficiently low moisture absorption over time (i.e. equilibrium moisture content) and hence in preventing adequately the active and passive introduction of moisture into the silicone sealants by the precipitated silica.

In summation, the particular properties of the precipitated silicas of the present invention lead to advantages which include the following:

high storage stability of RTV-1K silicone rubber compositions following incorporation of the silicas of the present invention;

rapid and effective dispersing and hence high thickening action of the silica in RTV-1K silicone rubber compositions.

Moreover, the precipitated silicas of the present invention offer a substantial cost advantage over the fumed silicas used to date in RTV 1 silicone rubber, being more inexpensive to prepare.

The subjects of the present invention are described in detail below.

In the present invention the terms silica and precipitated silica are synonymous. By "hydrophilic" precipitated silicas are meant those whose surface shows hydrophilic behavior when incorporated by stirring into water, i.e. those whose surface is completely wetted by water and therefore has a contact angle with respect to water of less than 90°. The hydrophilic precipitated silicas of the present invention preferably have a carbon content of <0.5% by weight.

The specific BET surface area describes the effect of the silica on the incorporation characteristics into silicone rubber and also on the crude mixing properties (cf. S. Brunauer, P. H. Emmett, E. Teller, "Adsorption of Gases in Multimolecular Layers", J. Am. Chem. Soc. 60, 309 (1938)). Thus the silicas of the present invention are distinguished by a BET surface area of 50 to 250 m$^2$/g, preferably of 100 to 230 m$^2$/g, more preferably of 120 to 200 M$^2$/g and very preferably 160 to 190 m$^2$/g. The specific BET surface area includes all values and subvalues therebetween, especially including 60, 70, 80, 90, 100, 110, 120, 130, 140, 150, 160, 170, 180, 190, 200, 210, 220, 230 and 240 m$^2$/g.

The specific CTAB surface area is of decisive importance primarily for the reinforcing property of the silica (cf. Janzen, Kraus, Rubber Chem. Technol. 44, 1287 (1971)). The reinforcing potential increases with increasing CTAB surface area. Thus the precipitated silicas of the present invention are distinguished by a CTAB surface area of 50 to 250 m$^2$/g, preferably of 100 to 230 m$^2$/g, more preferably of 120 to 200 m$^2$/g and very preferably 160 to 200 m$^2$/g. The CTAB surface area includes all values and subvalues therebetween, especially including 60, 70, 80, 90, 100, 110, 120, 130, 140, 150, 160, 170, 180, 190, 200, 210, 220, 230 and 240 m$^2$/g.

It has additionally been found that a high DBP absorption on the part of the silicas of the present invention is of benefit in order to obtain effective theological properties. Excessively high DBP values, however, may lead to an excessive increase in the viscosity of the silicone rubber and ought therefore to be avoided. The silicas of the present invention, accordingly, have a DBP absorption of 200 to 350 g/(100 g). Preferably the DBP absorption is 220 to 330 g/(100 g), more preferably 250 to 320 g/(100 g) and very preferably 270 to 320 g/(100 g). The DBP absorption includes all values and subvalues therebetween, especially including 210, 220, 230, 240, 250, 260, 270, 280, 290, 300, 310, 320, 330, and 340 g/(100 g).

Because of the sensitivity of RTV-1K silicone rubber compositions to hydrolysis the equilibrium moisture content (measured at 70% relative humidity/20° C.) is a key criterion of the silicas of the present invention. For the silicone rubber compositions to have high storage stability in a cartridge/tube, it is necessary for as little moisture as possible to be entrained into the system, since otherwise the composition will cure prematurely before its actual use for sealing. The silicas of the present invention are distinguished by an equilibrium moisture content of 0.5% to 5.0%, preferably of 0.8% to 4.5%, very preferably of 1.0% to 4.0%, with particular preference of 1.0% to 3.7% and with especial preference of 2.0% to 3.7% by weight. The equilibrium moisture content includes all values and subvalues therebetween, especially including 1, 1.5, 2, 2.5, 3, 3.5, 4, 4.5%.

In a first preferred embodiment, moreover, the silicas of the present invention are distinguished by a silanol group density which is very specific in comparison to conventional precipitated silicas. For the determination of the silanol group density, the number of silanol groups on the surface of the silica is first determined by means of $LiAlH_4$. This alone, however, is not meaningful, since hydrophilic precipitated silicas with a high surface area generally have a higher absolute number of silanol groups than do hydrophilic precipitated silicas with a low surface area. Consequently it is necessary to relate the number of silanol groups to the surface area of the silica. A suitable surface area for this purpose is the BET surface area, since this describes the surface which is available even to relatively small molecules such as water, for example. The silanol group density of the silicas of the present invention is situated preferably in the range from 0.5 to 3.5 $SiOH/nm^2$, preferably from 0.5 to 3.0 $SiOH/nm^2$, more preferably from 1.0 to 3.0 $SiOH/nm^2$ and with very particular preference from 1.5 to 2.8 $SiOH/nm^2$. The silanol group density includes all values and subvalues therebetween, especially including 1, 1.5, 2, 2.5 and 3 $SiOH/nm^2$. If the number of silanol groups per $nm^2$ is too low, this may result in an excessively low yield point and may consequently have an adverse effect on the consistency of the silicone sealant. An optimized silanol group density, furthermore, has a positive effect on the storage stability of the silicone sealants.

In a second, likewise preferred embodiment, the precipitated silicas of the present invention have a low modified tapped density and hence a particularly good thixotropy. It should be noted here that the modified tapped density is a reference to the tapped density as measured on the uncompacted material. In order to be able to determine this variable even on materials which have already undergone preliminary compaction as a result of packaging and storage, it is necessary to carry out sample preparation as described in the section "Determining the modified tapped density". The silicas of the present invention have a modified tapped density of less than or equal to 70 g/l, preferably of 1 to 60 g/l, more preferably of 5 to 55 g/l, very preferably of 10 to 50 g/l, and in particular of 20 to 50 g/l. The modified tapped density includes all values and subvalues therebetween, especially including 5, 10, 15, 20, 25, 30, 35, 40, 45, 50, 55, 60 and 65 g/l. Their low modified tapped density gives the precipitated silicas of the present invention an additionally advantageous effect. The low modified tapped density comes about as a result of a very loose packing of the silica particles. This means that, although in mutual contact and adhering gently to one another, the silica particles are nevertheless so loosely packed that large cavities are produced. This loose packing comes about in the silicone compound as well and in that case leads to a high level of thixotropy on the part of the silicone compound.

In one particularly preferred embodiment, in which the silicas of the present invention impart not only a particularly good consistency but also a particularly good storage stability to uncrosslinked silicone sealants, the silicas of the present invention have a sufficient porosity, as expressed by a DBP absorption of 200 to 350 g/(100 g), preferably 220 to 330 g/(100 g), very preferably 220 to 300 g/(100 g), with particular preference 250 to 320 g/(100 g) and with especial preference 280 to 310 g/(100 g) in combination with a low modified tapped density of 70 g/l, preferably 1 to 60 g/l, more preferably 5 to 55 g/l, very preferably 10 to 50 g/l, and in particular 20-50 g/l and also a low silanol group density of 0.5 to 3.0 $SiOH/nm^2$, preferably 1.0 to 3.0 $SiOH/nm^2$ and more preferably 1.5 to 2.8 $SiOH/nm^2$.

The inventors have observed, moreover, that for the consistency of the silicone sealants it may be of particular advantage if the precipitated silicas of the present invention contain a sufficient fraction of fine particles, i.e. of particles <1 µm. This applies to all of the embodiments described above. Therefore, the silicas of the present invention in the particle size range <1 µm of the volume-based particle distribution have a fine-particle fraction of preferably 5% to 100%, more preferably 10% to 95%, very preferably 10% to 70%, and with particular preference 15% to 70%. This fine-particle fraction includes all values and subvalues therebetween, especially including 5, 10, 15, 20, 25, 30, 35, 40, 45, 50, 55, 60, 65, 70, 75, 80, 85, 90 and 95%.

It has also been observed that an excessive fraction of coarse particles may adversely affect the performance properties of the precipitated silicas of the present invention. For this reason, the silicas of the present invention are preferably distinguished by a d90 value, relative to the volume-based particle distribution curve, of between 0.01 and 10 µm, preferably between 1 and 10 µm, more preferably between 2 and 8 µm and with particular preference between 3 and 7 µm. The d90 value, relative to the volume-based particle distribution curve, includes all values and subvalues therebetween, especially including 0.05, 0.1, 0.5, 1, 1.5, 2, 2.5, 3, 3.5, 4, 4.5, 5, 5.5, 6, 6.5, 7, 7.5, 8, 8.5, 9 and 9.5 µm.

The particle distributions may be monomodal or bimodal, preferably bimodal.

It has also been observed that for all of the above-described embodiments of the silicas of the present invention it may be of particular advantage if from the outset the hydrophilic silica introduces very little moisture into the silicone sealant. The silicas of the present invention may therefore have an initial moisture content, expressed by loss on drying, of 0.1%-3.0%, preferably of 0.2% to 2.5%, more preferably 0.3% to 2.0%, and with particular preference 0.4% to 1.8% by weight and/or a loss on ignition of 0.1%-3.0%, preferably 0.2% to 3.0%, more preferably 0.3% to 2.0%, and with particular preference 0.4% to 1.8% by weight. The loss on drying includes all values and subvalues therebetween, especially including 0.5, 1, 1.5, 2 and 2.5%. The loss on ignition includes all values and subvalues therebetween, especially including 0.5, 1, 1.5, 2 and 2.5%.

Finally, it has been observed for all of the above-described embodiments of the silicas of the present invention that it may be of particular advantage if the hydrophilic silica has a pH value in the range from 4 to 8, preferably 4.5 to 7.5. The pH includes all values and subvalues therebetween, especially including 4.5, 5, 5.5, 6, 6.5, 7 and 7.5. If the pH is too high then the situation may arise that, following prolonged storage (e.g. after several days), the silicone compound no longer properly crosslinks, but instead remains tacky.

The stated ranges of preference may be set independently of one another.

The silicas of the present invention can be prepared by a process which comprises the steps described below of A. reacting at least one silicate with at least one acidifier
B. filtering and washing the resulting silica
C. drying the resulting silica or filter cake
D. heat-treating the dried silica.

Step A here preferably comprises the substeps of

Aa. preparing an initial charge of water or of water and at least one silicate and/or a silicate solution, the pH of the resulting initial charge being preferably between 5 and 10 and the temperature of the initial charge being preferably between 80 and 100° C.

Ab. metering at least one silicate and/or a silicate solution and at least one acidifier into the initial charge from substep Aa) with stirring at 80 to 100° C. until the viscosity rise point is reached. With particular preference, silicate and/or silicate solution and acidifier are added simultaneously and/or in such a way that the pH for the period of substep Ab) is kept constant at a level between 7 and 10.

Ac. stopping the addition of silicate and/or silicate solution and acidifier, and stirring the precipitation suspension at a temperature of 80 to 100° C. for a period of 15 to 120 minutes, Ad. adding silicate and/or silicate solution so that the pH of the precipitation suspension is increased to 8 to 11 and, after the increased pH has been reached, stirring the precipitation suspension for a period of 15 to 90 minutes at this pH and at a temperature of 80 to 100° C., Ae. adding acidifier so that the pH of the precipitation suspension is lowered to 7 to 10, preferably with the temperature remaining the same as in substep Ad), Af. continuing the precipitation in accordance with substep Ab), adding silicate and/or silicate solution and acidifier simultaneously at a temperature of 80 to 100° C. until the solids content of the precipitation suspension reaches a level which, after substep Ag) has been carried out, results in the desired solids content.

Ag. adding an acidifier at a temperature of the precipitation suspension of 80 to 100° C., so that the pH of the precipitation suspension is lowered to 2 to 6 and the solids content of the precipitation suspension at the end of this substep is between 30 and 70 g/l.

Preferably the silicas of the present invention are ground. This takes place with particular preference by grinding the silicas of the present invention in a step Ca, i.e. between steps C and D, or in a step E, i.e. after step D, or both in step Ca, i.e. between steps C and D, and in step E, i.e. after step D.

All known forms of silicate are suitable for the silicates or silicate solutions used in step A) of the process of the present invention. The silicates used in accordance with the present invention are preferably alkaline silicates, e.g. sodium or potassium silicates. With particular preference the silicate in step A is sodium silicate (water glass). Its weight ratio of $SiO_2$ to $Na_2O$ is between 2 and 4, preferably between 3 and 3.6 and more preferably between 3.3 and 3.5. The $SiO_2$ content is between 20% and 40% by weight, preferably between 25% and 30% by weight. The weight ratio of $SiO_2$ to $Na_2O$ includes all values and subvalues therebetween, especially including 2.2, 2.4, 2.6, 2.8, 3, 3.2, 3.4, 3.6, and 3.8. The $SiO_2$ content includes all values and subvalues therebetween, especially including 22, 24, 26, 28, 30, 32, 34, 36 and 38% by weight.

Acidifiers are acidic compounds of organic or inorganic type which can be used to lower the pH of the precipitation suspension. With preference it is possible to use inorganic acids such as hydrochloric acid, phosphoric acid, sulphuric acid or nitric acid, or organic acids such as acetic acid, formic acid or carbonic acid or carbon dioxide. Both dilute and concentrated acids can be used. With particular preference the process of the present invention uses sulphuric acid.

Preferably the silicate and/or the silicate solution and acidifier used in substeps Aa) to Ag) are identical.

The pH of the initial charge in substep Aa) is preferably between 7 and 10, more preferably between 8 and 9. The temperature of the initial charge is set at 80 to 100° C., preferably at 85 to 95° C.

In substeps Ab) and Af) silicate and acidifier are metered in preferably simultaneously. The addition of the two components preferably takes place continuously constantly over the entire period of substeps Ab) and Af). During this period the temperature remains at 80 to 100° C., preferably at 85 to 95° C. The period of the addition in step Af) lasts until the solids content to be achieved at the end of step Ag) has been achieved. The precipitation is interrupted at the viscosity rise point. This viscosity rise point corresponds to the point in time at which a sharp rise is observed in the viscosity of the precipitation suspension in the course of precipitation; cf. EP 0643015. During substep Ab), in which the precipitation of the silica beings, and substep Af) the pH is as far as possible kept constant at a level of between 7 and 10, preferably constant at a level of between 7.5 and 9.5 and with very particular preference at a pH of between 8 and 9. Corrections to an off-target pH are generally made by increasing or lowering the addition of the acidifier, so that the set pH preferably fluctuates only by ±0.2 pH units, more preferably by only ±0.1 pH units.

When the viscosity rise point is reached, precipitation is interrupted. In substep Ac) the addition of silicate and/or silicate solution and acidifier is stopped. The interruption takes place for a period of 15 to 120 minutes, preferably of 40 to 100 minutes and more preferably of 75 to 100 minutes, and especially of 85 to 95 minutes.

In substep Ad) of the specific embodiment, the pH of the precipitation suspension is increased by addition of silicate to a pH of 8 to 11, preferably 9 to 11, more preferably 9.5 to 10.5, and when the increased pH has been reached, the precipitation suspension is stirred for a period of more than 15 to 90 minutes, preferably for a period of 45 to 75 minutes, at this pH and at a temperature of 80 to 100° C., Subsequently in substep Ae) acidifier is added to lower the pH of the precipitation suspension to 7 to 10, preferably to 7.5 to 9, at constant temperature.

Thereafter in substep Af) the simultaneous metered addition of silicate and/or silicate solution and acidifier is resumed, i.e. continued until the intended solids content is reached. With preference this takes place at the same pH, same temperature and same metering speeds as in substep Ab) before the viscosity rise point was reached.

Through addition of an acidifier at a temperature of the precipitation suspension of 80 to 100° C. its pH is lowered in substep Ag) to 2 to 6, preferably 3 to 6, more preferably to 3 to 4. The solids content of the precipitation suspension at the end of this substep is between 30 and 70 g/l, preferably between 45 and 60 g/l and with very particular preference between 45 and 55 g/l.

Without in any way being tied to one particular theory, the intention is that, in the specific embodiment of the process of the present invention, the additional substeps Ac) to Ae) should further intensify, in its cohesion and hence in its mechanical stability, the chain-like structure of the aggregates that has been produced in substep Ab) up to the viscosity rise point.

The filtration, liquefaction (e.g. in accordance with DE 2447613) and both longer and accelerated drying of the silicas of the present invention are familiar to the person skilled in the art and can be looked up, for example in the documents specified in the description. The filtration and the washing of the silica take place preferably in such a way that the conductivity of the end product is <1000 µS/cm, preferably <500 µS/cm and more preferably <200 µS/cm.

The silica of the present invention is dried preferably in a pneumatic conveying drier, spray drier, rack drier, belt drier, rotary tube drier, flash drier, spin-flash drier or nozzle tower drier. These drying variants include operation with an atomizer, with a single-fluid or two-fluid nozzle or of an integrated fluid bed. Spray drying may be carried out in accordance for example with U.S. Pat. No. 4,094,771.

If the selected mode of drying is spray drying then the filter cake should be redispersed beforehand. Redispersion takes place preferably in water or aqueous acid so that the dispersion has a pH of 4-7. It should be ensured here that the silica dispersion when redispersion is at an end has a solids content of 5% to 18%, preferably 8%-13% by weight, more preferably 9% to 11%, and that in the course of redispersion the shearing forces acting on the silica are not too great. This can be achieved, for example, by stirring with a rotary speed of <1000 rpm, with generalized rather than localized stirring. The redispersed silica dispersion is metered into the spray drier preferably such that the temperature at the drier exit is from 100 to 170° C., preferably 130-160° C.

In order to ensure low moisture absorption, in addition to precipitation in accordance with the provisos of steps Ab) and Af) and the pH variation in steps Ac) to Ae), a heat treatment is necessary as well. Through the combination of these measures the structure and the surface of the silicas of the present invention are optimized in such a way that the desired properties are attained. The heat treatment in step D may be carried out batchwise or continuously. For the heat treatment it is possible, for example, to use a fluidized-bed, fluid-bed or rotary-tube reactor. It should be ensured that in the course of the heat treatment, the temperature distribution and the process gas atmosphere are homogeneous, so that all of the silica particles are exposed to identical conditions. The process gas must have a sufficient steam concentration. The steam concentration is preferably 10% to 95% by volume, more preferably 40% to 90% by weight, very preferably 50% to 90% by weight. The steam concentration includes all values and subvalues therebetween, especially including 20, 25, 30, 35, 40, 45, 50, 55, 60, 65, 70, 75, 80, 85 and 90% by weight.

Particularly when using a rotary-tube reactor it must be ensured that the temperatures everywhere are the same, i.e. that no "cold zones" exist in which the steam could condense. The condensed steam may lead to the agglomeration of the silicas. The particular conditions during the heat treatment of the present invention also ensure that a silica which has already been ground prior to heat treatment need not be ground once again after heat treatment, in other words that no instances of caking or agglomeration arise, such caking or agglomeration otherwise having to be removed by grinding again after heat treatment.

Preference is given to using a fluidized-bed or fluid-bed reactor. By a fluidized bed is meant the following:

If a flow of gases from below traverses fine-particle bulk product lying on horizontal, perforated plates, under certain flow conditions a condition comes about which is similar to that of a boiling liquid; the layer bubbles; the particles of the bulk material are located within the layer in a continually fluidizing up-and-down motion and thus remain, so to speak, in suspension. Terms also used are therefore suspension bed, fluidized bed, fluid bed, and fluidizing. The associated large surface area of the fluidized product also facilitates the drying and heat treatment of solids.

It is important that during heat treatment all particles of silica are exposed to nearly the same or preferably the same temperature and the same process gas. The temperature differences between the hottest and coldest point ought to be as small as possible. Consequently the temperature of the filter candles as well must not be below the product temperature.

With very particular preference, the heat treatment in step D of the process of the present invention takes place in accordance with substeps Da) to De) below:

Da. introducing the hydrophilic silica into the fluidized-bed reactor.

Db. preheating the reactor to 300 to 800° C., the reactor being traversed at the same time by a flow of inert gas and/or nitrogen/air mixture in such a way as to produce a fluidization velocity of 0.02 to 0.06 m/s.

Dc. feeding in a gas mixture I comprising steam and an inert gas, e.g. nitrogen, or a gas mixture II comprising steam, an inert gas and air, at 300 to 800° C. for a period of 0.25 to 6 h, the gas mixture traversing the reactor with a fluidization velocity of 0.02 to 0.06 m/s, and the gas mixtures I and II having a steam concentration of 10 to 95% by volume and in the case of gas mixture II an oxygen content of 0.01% to 21% by volume.

Dd. interrupting the addition of steam and expelling the steam by means of an inert gas, nitrogen for example, and/or of an inert gas/air mixture at 300 to 800° C., the gas or gas mixture traversing the reactor with a fluidization velocity of 0.02 to 0.06 m/s, and, if using an inert gas/air mixture, said mixture having an oxygen content of 0.01% to 21% by volume.

De. cooling the heat-treated hydrophilic silica to room temperature in a dry process atmosphere, and, if using an inert gas/air mixture, said mixture having an oxygen content of 0.01% to 21% by volume.

After the hydrophilic silica has been introduced into the fluidized-bed reactor (substep Da)), the reactor is heated in substep Db) to an operating temperature of 300 to 800° C., preferably of 350 to 700° C. and more preferably of 400 to 650° C. During the heating operation the reactor is traversed by a flow of inert gas, preferably nitrogen and/or a mixture of an inert gas and dry air, in such a way that a fluidization velocity of 0.02 to 0.06 m/s is set.

After the operating temperature has been reached, in substep Dc) a gas mixture I comprising steam and an inert gas, preferably nitrogen, or a gas mixture II comprising steam, an inert gas and air is passed through the reactor for a period of 0.25 to 6 h, preferably 0.5 to 5 h, more preferably 1 to 4 h, very preferably 2 to 4 h. The fluidization velocity of the gas mixture is 0.02 to 0.06 m/s. The gas mixtures I and II have a steam concentration of 10% to 95% by volume, preferably 40% to 90% by weight, very preferably 50% to 90% by weight and, in the case of gas mixture II an oxygen content of 0.01% to 21% by volume.

The techniques for optional grinding of the silicas of the present invention are known to the person skilled in the art and can be looked up for example in *Ullmann, 5th edition, B2*, 5 20. For the grinding of the silicas of the present invention in step Ca) and/or in step E) it is preferred to use impact mills or opposed-jet mills. The grinding parameters are preferably chosen such that the ground product has a fine-particle fraction in the region smaller than 1 µm in the volume-based particle distribution, of 5% to 100%, preferably 10% to 95%, more preferably 15% to 95%, with very particular preference 20% to 90%, and in particular from 40% to 80%, and/or a d90 value in the volume-based particle distribution curve of between 0.01 and 10 μm.

The silicas of the present invention can be used in sealants, particularly in silicone rubber and silicone sealants and with particular preference in RTV-1K sealants. Their application is possible in various crosslinking systems, e.g. acetoxy-crosslinking, alkoxy-crosslinking and oxime-crosslinking. These systems find application, for example in the building industry as joint-sealants, in the automotive industry as adhesives and sealants and as coating compositions for textile fabrics, for example.

Having generally described this invention, a further understanding can be obtained by reference to certain specific examples which are provided herein for purposes of illustration only, and are not intended to be limiting unless otherwise specified.

EXAMPLES

The reaction conditions and the physical/chemical data of the precipitated silicas of the present invention were determined by means of the following methods:

Determining Filter Cake Solids Content

In accordance with this method the solids content of filter cakes was determined by removal of the volatile fractions at 105° C.

For this purpose 100.00 g of the filter cake were weighed out (initial mass E) into a dry, tared porcelain dish (20 cm diameter). The filter cake was broken up with a spatula if necessary to give loose lumps of not more than 1 cm³. The sample was dried to constant weight in a drying cabinet at 105±2° C. Subsequently the sample was cooled to room temperature in a desiccator cabinet with silica gel as desiccant. The final mass A was determined gravimetrically.

The solids content (SC) in % was determined in accordance with $SC=A/E*100\%$, where A=final mass in g and E=initial mass in g.

Determining Precipitation Suspension Solids Content

The solids content of the precipitation suspension was determined gravimetrically after the sample had been filtered.

100.0 ml of the homogenized precipitation suspension ($V_{suspension}$) were measured off at room temperature with the aid of a measuring cylinder. The sample was filtered through a circular filter (TYP 572, Schleicher & Schuell) in a porcelain suction filter unit, but was not sucked dry, so as to prevent cracking of the filter cake. Subsequently the filter cake was washed with 100.0 ml of distilled water. The washed filter cake was transferred to a tared porcelain dish and dried to constant weight in a drying oven at 105±2° C. The weight of the dried silica ($m_{sample}$) was determined after cooling to room temperature.

The solids content was determined in accordance with:

solids content in g/l=($m_{sample}$ in g)/($V_{suspension}$ in l).

Determining Silica-feed Solids Content

The silica feed was dried to constant weight in an IR drier. The loss on drying consists predominantly of water moisture.

2.0 g of silica feed were charged to a tared aluminium dish and the lid of the IR drying unit (Mettler, type LP 16) was closed. After the start button had been pressed, drying of the suspension at 105° C. commences, and was ended automatically when the weight decrease per unit time falls below a value of 2 mg/(120 s).

The weight decrease in % was displayed directly by the instrument when the 0-100% mode was selected. The solids content was given by solids content in %=100%−weight decrease in %.

Determining pH

The pH of the silica, as a 5% aqueous suspension, was determined at room temperature in a method based on DIN EN ISO 787-9. In contrast to the specifications of the aforementioned standard, the initial masses were changed (5.00 g of silica to 100 ml of deionized water).

Determining Electrical Conductivity

The electrical conductivity of silica, as a 4% aqueous suspension, was determined at room temperature in a method based on DIN EN ISO 787-14. In contrast to the specifications of the aforementioned standard, the initial masses were changed (4.00 g of silica to 100 ml of deionized water).

Determining the Moisture Content or Loss on Drying

The moisture content of silica was determined in accordance with ISO 787-2 after 2 hour drying in a forced-air drying cabinet at 105° C. This loss on drying was composed predominantly of moisture water.

Determining the Loss on Ignition

By this method the loss in weight of silica was determined in a method based on DIN EN ISO 3262-1 at 1000° C. At this temperature, water bound physically and chemically, and also other volatile constituents escape. The moisture content (LD) of the sample investigated was determined by the above-described method "Determining the moisture content or loss on drying", based on DIN EN ISO 787 2.

0.5 g of the pulverulent, spherical or granular silica was weighed out to an accuracy of 0.1 mg into a tared porcelain crucible which had been purified beforehand by calcining (initial mass E). The sample was heated in a muffle furnace at 1000±50° C. for 2 h. The porcelain crucible was subsequently cooled to room temperature in a desiccator with silica gel as desiccant. The final mass A was determined gravimetrically.

The loss on ignition (DIN) LOI in % was obtained in accordance with $LOI=(1-A/F)*100$.

F denotes the corrected initial mass in g based on dried matter, and was calculated according to $F=E*(1-LD/100)$.

In the calculations A denotes final mass in g, E denotes initial mass in g and LD denotes loss on drying, in %.

Determining the BET Surface Area

The specific nitrogen surface (called the BET surface area below) of the pulverulent, spherical or granular silica was determined by a method based on ISO 5794-1/Annexe D using the TRISTAR 3000 instrument (from Micromeritics) in accordance with the multipoint determination of DIN ISO 9277.

Determining the CTAB Surface Area

The method was based on the adsorption of CTAB (N hexadecyl-N,N,N-trimethylammonium bromide) on the "external" surface of the silica, in a method based on ASTM 3765 or NFT 45-007 (section 5.12.1.3).

CTAB was adsorbed in aqueous solution with stirring and ultrasound treatment. Excess, unadsorbed CTAB was determined by back-titration with SDSS (sodium dioctylsulphosuccinate solution, "Aerosol OT" solution) using a titroprocessor, the endpoint being given by the turbidity maximum of the solution and determined using a phototrode. The temperature throughout all of the operations conducted was 23-25°

C., to prevent crystallization of CTAB. The back-titration was based on the following reaction equation:

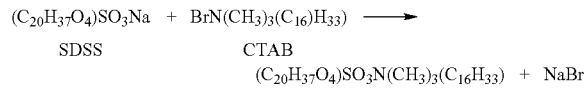

Apparatus

Mettler Toledo DL55 titroprocessor and Mettler Toledo DL70 titroprocessor, each equipped with pH electrode, Mettler, type DG 111 and phototrode, Mettler, type DP 550

100 ml polypropylene titration beaker

Glass titration vessel, 150 ml, with lid

Pressure filtration device, 100 ml capacity

Cellulose nitrate membrane filter, pore size 0.1 µm, 47 mm Ø, e.g. Whatman (Order No. 7181-004)

Reagents

The solutions of CTAB ($C_{CTAB}$=0.015 mol/l in deionized water) and SDSS (concentration=0.00423 mol/l in deionized water) were purchased in ready-to-use form (Bemd Kraft GmbH, 47167 Duisberg: Order No. 6056.4700 CTAB solution of concentration 0.015 mol/l; Order No. 6057.4700 SDSS solution 0.00423 mol/l), stored at 25° C. and used within one month.

Procedure

1. Blank Titration

The consumption of SDSS solution for titrating 5 ml of CTAB solution should be checked 1×daily before each series of measurements. This was done by setting the phototrode, before beginning the titration, at 1000±20 mV (corresponding to a transparency of 100%).

Precisely 5.00 ml of CTAB solution were pipetted into a titration beaker and 50.0 ml of deionized water were added. Titration with SDSS solution was carried out with stirring by the measurement method familiar to the skilled person, using the DL 55 titroprocessor, until the solution reaches maximum turbidity. The consumption VA of SDSS solution in ml was determined. Each titration should be performed in triplicate.

2. Adsorption 10.0 g of the pulverulent, spherical or granular silica with a moisture content of 5±2% (if appropriate, the moisture content was adjusted by drying at 105° C. in a drying cabinet or by uniform wetting) were comminuted for 30 seconds using a mill (Krups, model KM 75, article no. 2030-70). Precisely 500.0 mg of the comminuted sample (initial mass E) were transferred to a 150 ml titration vessel with magnetic stirrer rod and precisely 100.0 ml of CTAB solution (T1) were metered in. The titration vessel was closed with a lid and stirred using an Ultra Turrax T 25 stirrer (stirrer shaft KV 18G, 18 mm diameter) at 18000 rpm for not more than 1 minute until wetting was complete. The titration vessel was screwed on to the DL 70 titroprocessor and the pH of the suspension was adjusted with KOH (0.1 mol/l) to a figure of 9±0.05.

The suspension was sonicated for 4 minutes in the titration vessel in an ultrasound bath (Bandelin, Sonorex RK 106 S, 35 kHz, 100 W effective and 200 W peak output) at 25° C. This was followed immediately by pressure filtration through a membrane filter under a nitrogen pressure of 1.2 bar. The initial fraction of 5 ml was discarded.

3. Titration 5.00 ml of the remaining filtrate were pipetted into a 100 ml titration beaker and made up to 50.00 ml with deionized water. The titration beaker was screwed on to the DL 55 titroprocessor and titrated with SDSS solution, with stirring, until maximum turbidity was reached. The consumption VB of SDSS solution, in ml, was determined. Each titration should be performed in triplicate.

Calculation $$CTAB(\text{without moisture correction}) = \frac{V_A - V_B}{V_A} * \frac{C_{CTAB} * M_{CTAB} * T_1 * P}{E}$$

$V_A$=consumption of SDSS solution in ml in titrating the blank sample $V_B$=consumption of SDSS solution in ml when using the filtrate $C_{CTAB}$=concentration of CTAB solution in mol/l $M_{CTAB}$=molar mass of CTAB=364.46 g/mol $T_1$=amount of CTAB solution added in l P=surface occupancy of CTAB=578.435 m2/g E=initial mass of silica The CTAB surface area was based on the anhydrous silica, which is why the following correction was made.

$$CTAB = \frac{CTAB(\text{without moisture correction}) \text{ in } m^2/g * 100\%}{100\% - \text{moisture content in } \%}$$

The moisture content of the silica was determined in accordance with the above-described method "Determining the Moisture Content".

Determining the DBP Absorption

The DBP absorption (DBP number), which was a measure of the absorbency of the precipitated silica, was determined by a method based on the DIN 53601 standard, as follows:

12.50 g of pulverulent or spherical silica with a moisture content of 0-10% (the moisture content was adjusted, if appropriate, by drying at 105° C. in a drying cabinet) were introduced into the kneader chamber (article number 279061) of the Brabender Absorptometer "E" (without damping of the outlet filter of the torque sensor). In the case of granules, the sieve fraction from 1 to 3.15 mm (stainless steel sieves from Retsch) was used (by gently pressing the granules with a plastic spatula through the sieve with pore size of 3.15 mm). With continual mixing (kneader paddles rotating at a speed of 125 rpm), dibutyl phthalate was added dropwise to the mixture at a rate of 4 ml/min and at room temperature by means of the Brabender T 90/50 Dosimat. The incorporation of the DBP by mixing takes place with only a small amount of force, and was monitored by means of the digital display. Towards the end of the determination the mixture becomes pasty which was indicated by a sharp increase in the required force. At a display reading of 600 digits (torque of 0.6 Nm) an electrical contact shuts off both the kneader and the DBP feed. The synchronous motor for the DBP feed was coupled to a digital counter, so that the consumption of DBP in ml can be read off.

The DBP absorption was reported in g/(100 g) and was calculated using the following formula:

$$DBP = \frac{V*D*100}{E} * \frac{g}{100\ g} + K$$

where

DBP=DBP absorption in g/(100 g)

V=consumption of DBP in ml

D=density of DBP in g/ml (1.047 g/ml at 20° C.)
E=initial mass of silica in g
K=correction value as per moisture correction table in g/(100 g)

The DBP absorption was defined for the anhydrous, dried silica. If moisture precipitated silicas were used it was necessary to take into account the correction value K for calculating the DBP absorption. This value can be determined using the correction table below: for example, silica having a water content of 5.8% would require an add-on of 33 g/(100 g) for the DBP absorption. The moisture content of the silica was determined in accordance with the method "Determining the Moisture Content or Loss on Drying".

Moisture correction table for dibutyl phthalate absorption (anhydrous)

| % moisture | .0 | .2 | .4 | .6 | .8 |
|---|---|---|---|---|---|
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Determining the Silanol Group Density

First of all the moisture content of the silica sample was determined in accordance with the section "Determining the Moisture Content or Loss on Drying". Thereafter 2 4 g of the sample (to an accuracy of 1 mg) were transferred to a pressure-tight glass apparatus (glass flask with dropping funnel) with a pressure measurement means attached. In this apparatus it was dried under reduced pressure (<1 hPa) at 120° for 1 h. At room temperature then, approximately 40 ml of a degassed 2% strength solution of LiAlH4 in diglyme was added dropwise from the dropping funnel. If appropriate, further solution was added dropwise until no further increase in pressure was observed. The increase in pressure as a result of the hydrogen evolved when the LiAlH4 reacts with the silanol groups of the silica was determined by way of pressure measurement (with the volume known as a result of calibration of the apparatus prior to measurement) to an accuracy of ≤1 hPa. From the increase in pressure it was possible, by calculation using the general gas equation, to work back to the silanol group concentration of the silica, taking into account the moisture content of the silica. The influence of the vapor pressure of the solvent should be corrected correspondingly. From the silanol group concentration, the silanol group density was calculated as follows:

$$\text{Silanol group density} = \frac{\text{silanol group concentration}}{\text{BET surface area}}$$

Determining the Particle Size Distribution by Means of Laser Diffraction

The particle distribution was determined in accordance with the principle of laser diffraction on a laser diffractometer (Horiba, LA 920).

First of all the silica sample was dispersed in 100 ml of water without additional dispersing additives in a 150 ml glass beaker (diameter: 6 cm) in such a way as to give a dispersion having a weight fraction of 1% by weight SiO2. This dispersion was then dispersed using an ultrasonic probe (Dr. Hielscher UP400s, Sonotrode H7) for a duration of 5 minutes intensely (300 W, without pulsing). For this purpose the ultrasound probe was to be mounted such that its lower end was immersed to a distance of approximately 1 cm above the base of the glass beaker. Immediately following the dispersing operation the particle size distribution of a sample of the ultrasonicated dispersion was determined using a laser diffractometer (Horiba LA 920). For the evaluation, using the standard software supplied with the Horiba LA 920, a refractive index of 1.09 should be selected.

All measurements take place at room temperature. The particle size distribution and also the relevant variables such as, for example, the particle size d90 were automatically calculated and depicted in graph form by the instrument. Attention should be paid to the notes in the operating instructions.

Determining the Contact Angle

The contact angle was determined, as described in W. T. Yen, R. S. Chahal, T. Salman, Can. Met. Quart., Vol. 12, No. 3, 1973.

Determining the Modified Tapped Density

With the "conventional" tapped density determination of DIN EN ISO 787-11, the result can be falsified by the fact that the silica had already undergone preliminary compaction in the course, for example, of being packed. In order to rule this out, a "modified tapped density" was determined for the silicas of the present invention.

A porcelain suction filter (nominal size 110, diameter=12 cm, height=5.5 cm) fitted with a circular filter (e.g. type 598, Schleicher+Schull) was filled loosely with silica to approximately 1 cm from the top edge, and was covered with elastic film (Parafilm®). The shape and dimensions of the elastic film were to be selected such that it finishes very closely or completely flush with the edge of the porcelain suction filter unit. The unit was mounted on a suction bottle and then a vacuum of 0.7 bar was applied for a period of 5 minutes. In the course of this operation, the silica was compacted uniformly by virtue of the film under suction. Then air was cautiously readmitted and the resulting silica plaque was removed from the filter unit by being tipped forcefully into a porcelain dish.

The slightly precomminuted material was redispersed uniformly (in the manner of a silica/air aerosol) via a centrifugal mill (ZM1, Retsch, 0.5 mm screen insert, speed setting 1, without cyclone, without internal funnel insert) with an internal collecting dish (the silica (starting material) was introduced slowly—spatula by spatula—into the mill feed; the internal product collection dish should never become completely full). During this operation the power consumption of the mill should not exceed 3 amperes. This operation was less a conventional grinding than a defined loosening of the silica structure (of air-jet-milled silicas, for example), since the energy input here was substantially weaker than in the case of jet milling.

5 g of the resulting material were weighed out to an accuracy of 0.1 g into the 250 ml volumetric cylinder of the jolting volumeter (STAV 2003 from Engelsmann). In a method based on DIN ISO 787 11, after jolting 1250 times, the resulting volume of the silica, in ml, is read off on the scale.

$$\text{Modified tapped density in } [g/l] = \frac{5 \text{ g}}{\text{tapped volume in [ml]}} \times \frac{1000 \text{ ml}}{1 \text{ l}}$$

Determining the Equilibrium Moisture Content at 70% Relative Humidity and 20° C.

The equilibrium moisture content of a silica was determined in accordance with the principle of dynamic steam sorption. It involves determining the weight increase on the adsorption of water on the silica surface and the weight decrease during desorption (instrument: DVS 1000 from SMS). Details of its implementation were described in the operating instructions. In certain circumstances a hysteresis was observed between the adsorption and desorption curves.

Measurement takes place at 20° C. To start with a stream of dry air (0% relative humidity) was passed at a constant weight over 10 50 mg of a silica sample. Thereafter the moisture content of the air stream was raised in steps of approximately 10% up to a maximum humidity of 97%-100%. Following each increase in humidity there was a waiting phase until the sample reaches constant weight (criterion: dm/dt<0.0005%/min). The equilibrium moisture content (20° C./70%) reported was the percentage weight increase (based on the dry sample at 0% relative humidity) which occurs at 70% relative humidity of the air stream during the adsorption phase.

The examples below are intended to illustrate the present invention without restricting its scope.

The water glass and the sulphuric acid used at various points in the directions of Example 1 below were characterized as follows:

Water glass: density 1.348 kg/l, 27.0% by weight $SiO_2$, 8.05% by weight $Na_2O$, Sulphuric acid: density 1.83 kg/l, 94% by weight.

Example 1

A 2 m² precipitating vessel (diameter 160 cm) with inclined base, MIG inclined-blade stirrer system and Ekato fluid shear turbine was charged with 1500 l of deionized water and this initial charge was heated to 90° C. After the temperature had been reached, and over a period of 52 minutes, water glass was metered in at a rate of 3.52 kg/min, and sulphuric acid was metered in, at a rate of 0.47 kg/min with stirring until the viscosity rise point was reached. The rate of metering of sulphuric acid must be corrected if appropriate so that during this time a pH of 8.5 was maintained. Subsequently the metering of water glass and sulphuric acid was interrupted for a period of 90 minutes. Within this time the precipitation suspension was stirred at 90° C. Following the interruption, water glass was added to raise the pH to 10 over the course of 20 minutes, and the pH was maintained at this level for a period of 60 minutes. During this time the precipitation suspension was stirred further at 90° C. Subsequently sulphuric acid was added to lower the pH to 8.5 again over the course of 5 minutes. Then, with stirring and at 90° C., water glass and sulphuric acid were added simultaneously, water glass at a rate of 3.52 kg/h and acid at a rate of 0.47 kg/h, until the solids content in the precipitation suspension had reached approximately 50 g/l.

Thereafter the water glass feed was shut off, with retention of the temperature, and with the same rate of metering of sulphuric acid the precipitation suspension was acidified to a pH of 3.

The precipitation suspension had a solids content of approximately 50 g/l.

The resulting suspension was filtered with a membrane filter press and the filter cake was washed with deionized water until the wash water was found to have a conductivity of <1 mS/cm. The filter cake then had a solids content of <20%.

Before drying by means of a spray drier, the filter cake was redispersed with deionized water to a solids content of 8%-10%, during which it must be ensured that it was not exposed to any strong shearing forces.

The metering of the liquefied filter cake into the spray drier takes place in such a way that the temperature measured at the drier outlet was approximately 150° C.

Subsequently the material was treated in a fluidized-bed reactor (expanded fluidized bed height approximately 1.5 m, fluidized-bed diameter approximately 0.5 m). For this purpose the following conditions should be observed:

First of all, 30 kg of the spray-dried powder were introduced into the fluidized-bed reactor with fluidizing base. The fluidizing base was traversed by a gas mixture comprising dry nitrogen and dry air. These two gases were metered prior to their entry into the reactor in such a way that a resulting oxygen content of 6% by volume was not exceeded and in such a way as to give a fluidization velocity in the reactor of 0.05 m/s. The reactor was then heated from room temperature to 450° C. The flow rates of the fluidizing gas should be regulated during the reheating phase such that the fluidization velocity in the reactor remains constant at 0.05 m/s.

After 450° C. had been reached, a preheated gas mixture of steam, nitrogen and air was fed into the reactor for a period of 3 hours. The three components were mixed so as to set a steam concentration of 50% and an oxygen content of 3%. Volumes of nitrogen and of air were adapted so that, again, a fluid gas velocity at 0.05 m/s comes about.

Thereafter the addition of steam was interrupted. Nitrogen and air volumes were adapted so as to result, again, in a fluidization velocity of 0.05 m/s and an oxygen content of approximately 6%.

After at least five times the volume of dry process gas had been passed through the fluidized-bed reactor, after the interruption of the steam supply, the product was cooled to room temperature in a dry process gas atmosphere. Cooling takes place with fluidization in a nitrogen/air mixture in which the oxygen content was approximately 6%. In the cooling phase, particular care should be taken that at this point there was no longer any steam present.

Following the fluidized-bed treatment, the material was very finely ground on a fluid-bed opposed-jet mill AFG 50 from Alpine. The chemicophysical data of Example 1 are listed in Table 1.

Comparative Examples 1-2

The following commercially available hydrophilic silicas were analyzed (see Table 1) and incorporated into sealants in Example 4:

Comparative Example 1: Siloa™ 72 X (Rhodia AG)
Comparative Example 2: Ultrasil® VN 3 (Degussa AG)

TABLE 1

|  |  | Example 1 | Comparative Example 1 | Comparative Example 2 |
|---|---|---|---|---|
| BET | m²/g | 176 | 167 | 170 |
| CTAB | m²/g | 187 | 156 | 153 |
| DBP | g/100 g | 296 | 261 | 222 |

TABLE 1-continued

|  |  | Example 1 | Comparative Example 1 | Comparative Example 2 |
|---|---|---|---|---|
| pH | — | 7.0 | 5.8 | 6.4 |
| Loss on drying | % | 1.6 | 2.4 | 5.5 |
| Loss on ignition | % | 1.3 | 2.5 | 4.2 |
| Silanol group density | $SiOH/nm^2$ | 2.729 | 3.823 | 3.822 |
| Modified tapped density | g/l | 47 | 72 | 97 |
| Fraction of fine particles <1 μm [1] | % | 15.5 | 0.0 | 0.0 |
| Type of particle distribution |  | bimodal | monomodal | monomodal |
| Equilibrium moisture content [2] | % | 3.5 | 5.2 | 8.7 |
| $d_{90}$ value of volume-based particle distribution | μm | 5.76 | 14.0 | 24.17 |
| Behavior of silica with respect to water |  | hydrophilic | hydrophilic | hydrophilic |

[1] with 5 minutes of ultrasound at 300 watts
[2] at 20° C. and 70% relative humidity

Example 2

Performance Tests 2.1 Preparation of Acetate-crosslinking RTV-1K Silicone Sealants with Precipitated Silicas The amounts required for preparing the formulation below are indicated in Table 2. In the course of preparation, cooling with mains water should be carried out so that the formulation does not undergo warming substantially beyond room temperature. Preparation takes place at room temperature and at a relative humidity of 40% to 60%.

A planetary dissolver (from H. Linden, type LPMD 2SP) equipped with a 2 l stirring vessel with jacket, cooling water connection and independently controllable planetary drive and a dissolver drive was charged with silicone polymer, plasticizer (silicone oil) and crosslinker and this initial charge was homogenized for 1 minute at a speed of 50 $min^{-1}$ (planetary drive) and 500 $min^{-1}$ (dissolver drive). Then the catalyst was added and the batch was homogenized for 15 minutes under an $N_2$ atmosphere with the same planetary and dissolver drive speeds. Thereafter the stabilizer and the silica were incorporated, again at the same speeds. As soon as the silica was fully wetted a vacuum of approximately 200 mbar was applied and dispersion takes place for 10 minutes at 100 $min^{-1}$ of the planetary stirrer mechanism and 2000 $min^{-1}$ of the dissolver.

Immediately after the end of the dispersing operation the stirring vessel was flushed with nitrogen. Using a drum press, the sealant was dispensed as quickly as possible into aluminium tubes (cartridges).

2.2 Production of Vulcanizates from RTV-1K

In order to examine the performance properties of RTV 1K silicone sealants in which the silicas of the present invention were used it was necessary to produce vulcanizates from the sealants prepared above. These vulcanizates were processed into test specimens. For this purpose, first of all the silicone sealant was applied to a smooth support plate in a sufficient amount and was coated with a coating bar (slot height: 2 mm) to form a strip 2 mm in height, approximately 80 mm in width and with a length of approximately 300 mm. Care should be taken to ensure that no air bubbles are formed. The shapes needed for the respective test were then punched out from this silicone strip. The support plate ought to be made from polypropylene, polyethylene, Teflon or another plastic from which the vulcanized sealant was readily detachable.

The silicone strips were stored for 7 days for complete curing and then for at least 2 days under standard conditions (23° C., 50% relative humidity).

TABLE 2

| Formulation for preparing a one-component room-temperature vulcanizing (RTV-1K) silicone sealant (acetoxy system) | | | | | | |
|---|---|---|---|---|---|---|
| | | | Crosslinker 42 g Filling level 12% $SiO_2$ | | Crosslinker 30 g Filling level 12% $SiO_2$ | |
| | | | Initial | | | |
| Formulation constituent [general name] | Chemical identification | Product name and manufacturer | mass [g] | Fraction [%] | Initial mass | Fraction |
| Silicone polymer OH-terminated silicone polymer (viscosity = 50 000 mPa*s) | α,ω-hydroxydimethylsiloxy-polydimethylsiloxane | Silopren ® E 50 GE Bayer Silicones GmbH & Co. KG | 468.00 | 58.6 | 468.00 | 59.5 |
| Plasticizer Non-functional polydimethylsiloxane (silicone oil, viscosity = 1000 mPa*s) | α,ω-trimethylsiloxypoly-dimethylsiloxane | Oil M 1000 GE Bayer Silicones GmbH & Co. KG | 184.50 | 23.1 | 184.50 | 23.5 |
| Active filler Silica | Precipitated silica | Example 1 and Comparative Examples 1-2 | 95.79 | 11.999 | 95.79 | 12.2 |
| Crosslinker | Ethyltriacetoxysilane | Ethyltriacetoxysilane ABCR GmbH & Co. KG | 42.00 | 5.3 | 30.00 | 3.8 |
| Stabilizer | | TP 3556 GE Bayer Silicones GmbH & Co. KG, | 8.00 | 1.0 | 8.00 | 1.0 |

TABLE 2-continued

Formulation for preparing a one-component room-temperature vulcanizing (RTV-1K) silicone sealant (acetoxy system)

| Formulation constituent [general name] | Chemical identification | Product name and manufacturer | Crosslinker 42 g Filling level 12% SiO$_2$ Initial mass [g] | Fraction [%] | Crosslinker 30 g Filling level 12% SiO$_2$ Initial mass | Fraction |
|---|---|---|---|---|---|---|
| Catalyst | dibutyltindiacetate | TEGOKAT 233 Goldschmidt TIB GmbH | 7 drops 0.01 g | 0.001 0 | 7 drops 0.01 g | 0.001 0 |
| Total amounts | | | 798.3 | 100 | 786.3 | 100 |

2.3 Determining the Rheological Properties and the Storage Stability of RTV-1K Sealants The sealants prepared in accordance with Example 2, section 1, "Preparation of Acetate-Crosslinking RTV-1K Silicone Sealants with Precipitated Silicas" were stored prior to testing for at least 24 hours in a controlled-climate chamber at 23° C./50% relative humidity.

To test the storage stability of the sealants, two tubes were stored for 35 days in a controlled-climate chamber at 23° C. at 50% relative humidity and were tested after storage periods respectively of 1, 7, 14, 21, 28 and 35 days. Additionally, two further tubes were stored in a forced-air oven at 50° C. for 35 days and likewise tested after 1, 7, 14, 21, 28 and 35 days of storage.

The rheological properties were determined using a Haake RheoStress 1 rheometer (controlled via PC using the RheoWin Pro program). The operation of the instrument and of the software was described in detail in the Haake operating instructions. For the measurement it was necessary to use a die having a diameter of 35 mm, and the measuring-plate attachment MPC 35. Measurement was conducted under the following conditions:

| | |
|---|---|
| Slot distance between die and measuring-plate attachment: | 0.5 mm |
| Measurement temperature: | 23° C. |
| Measurement range (shear rate) | 0-10 1/s |
| Number of measurement points: | 400 |

The measurement points are plotted in a diagram which shows the shear rate $\gamma$ on the x axis and the shear stress $\tau$ on the y axis. At a shear rate of 10 l/s the shear stress was read off and from this figure the viscosity $\eta$ at 10 l/s was calculated using $\eta = \tau/\gamma$. Two tubes were measured, with at least three measurements being carried out per tube. From the six individual results the highest and lowest values were discarded. The remaining four results were used to calculate the average value.

For the determination of the yield point the Casson model was used. The data basis for calculating the Casson flow curve was the range from 0.2 to 2 l/s from the shear rate/shear stress diagram. The following relationship was defined:

$$\tau = f\left(\overset{\circ}{\gamma}\right)$$

The value on the y axis, at which it intersects the flow curve calculated by the method of Casson was reported as the Casson yield point.

The determination both of the viscosity at 10 l/s and of the Casson yield point was made automatically under the conditions indicated above by the RheoWin Pro software.

2.4 Determining the Tensile Strength and the Breaking Extension of Vulcanized Silicone Rubber This determination was made by a method based on DIN 53504 and was used to determine the tensile strength and the breaking elongation of specimens of defined shape made from elastomers, when the specimens were extended at a constant speed until they rupture. The tensile strength and the breaking extension in this case are defined as follows:

The tensile strength $\delta_{max}$ is the ratio of the measured maximum force $F_{max}$ to the initial cross-section $A_0$ of the specimen.

The breaking elongation $\epsilon_R$ is the ratio of the length change $L_A$ measured at the moment of rupture to the original measurement length $L_0$ of the specimen.

Measurement was carried out on a tensile testing machine (Zwick/Roell, type Z010), ensuring that the preselected maximum force was variable, that the clamping device holds the test specimen firmly without mechanical damage even at high stretch, and holds the centre piece of the test specimen at the set measurement length $L_0$, without mechanical damage, even at high stretch, and that the spring pressure on the clamping jaws of the fine extension gauge was adjustable.

The standard dumbbells S1 described in FIG. 1 are to be used.

The corresponding test specimens were punched from the vulcanized strip 2 mm thick using a punching iron for S1 standard dumbbells, and these test specimens were stored for at least 24 h under standard conditions (23° C., 50% relative humidity) before testing.

4-6 specimens were to be tested at a temperature of $(23\pm2)°$ C. Prior to the tensile test, a measurement should be made of the thickness d and the width b of the specimens. On clamping, the standard dumbbells should be clamped in centrally between the two clamping jaws. The distance between the clamping jaws was L=50 mm. The fine extension gauge should be set to a measurement length $L_0$ of 25 mm and should be fixed centrally between the clamping jaws. The displays should stand at zero. The rate of advance of the pulling bracket was v=500 mm/min. The force $F_{max}$ and the length change $L_A$ at rupture were recorded. From these figures the tensile strength and breaking extension were calculated as shown below and were reported as the average value of the individual measurements:

$$\text{Tensile strength } \delta_{max} = \frac{F_{max}}{A_0}$$

where
$\delta_{max}$=tensile strength in [MPa] or in [N/mm²]
$F_{max}$=maximum force in [N]
$A_0$=initial cross section (a*b) in [mm²]

$$\text{Breaking extension } \varepsilon_R = \frac{L_\Delta}{L_0} * 100$$

where
$\varepsilon_R$=breaking extension in [%]
$L_\Delta$=length change in [mm]
$L_0$=initial length in [mm]

2.5 Determining the Tear Propagation Resistance of Vulcanized Silicone Rubber

This determination was carried out by a method based on ASTM D 624 B. The tear propagation test on elastomers was used to determine the resistance presented by an incised sample to the continuation of a tear.

The tear propagation resistance of an elastomer was dependent on its formulating constituents and on its processing, on the vulcanization, and on the testing speed. The effect tested was the influence of the reinforcing filler on the tear propagation resistance of the vulcanizates. The measurement was carried out on a tensile testing machine (from Zwick/Roell, type Z010), ensuring that the preselected maximum force was variable and that the clamping device holds the test specimen firmly, without mechanical damage, even at high extension.

Test specimens (FIG. 2) were cut from the vulcanized silicone strips 2 mm thick, using a punching iron compliant with ASTM D 624 B and were stored for at least 24 h under standard conditions (23° C., 50% relative humidity) before testing.

At the vertex of the inside radius, the punching iron had a blade with which a slot 0.5 mm±0.05 mm in depth was incised at this point in the course of punching.

4-6 specimens should be tested, at a temperature of (23±2)° C. The specimens must be stored at the test temperature for 3 hours prior to testing. The thickness a of the specimens should be determined to ±0.01 mm prior to testing, using a thickness gauge. The sample was clamped into the clamping brackets of the tensile testing machine and ruptured at a rate of advance of v=500 mm/min, ensuring that the slot was on the left-hand side from the tester.

The two test specimens with the highest and lowest values were disregarded for the evaluation. The tear propagation resistance $\delta_{w1}$ in [N/mm] was calculated from the variables $F_{max1}$ (maximum force in [N]) and also a1 (thickness in [mm]) and was reported as the average value of the remaining individual measurements:

$$\text{Tear propagation resistance } \delta_{w1} = \frac{F_{max1}}{a_1}$$

The consistency of silicone rubber formulations into which the silicas of the present invention have been incorporated was assessed using the measurement results for the Casson yield point and for the viscosity at a shear rate of 1/10 (Table 3).

By consistency was meant the theological behavior of an RTV-1K silicone sealant. Consistency was said to be good if silicone rubber applied to a vertical surface adheres to that surface without running over 24 h in the course of curing. Adequate consistency can be recognized from a viscosity of ≥100 Pas and a yield point of ≥90 Pa. The values for the Casson yield point clearly show that the yield point of silicone rubber formulations comprising the silica of Example 1 (according to the present invention), with a figure of 90, was much higher than in the case of the silicone rubber formulations comprising the comparison silicas. In other words, silicone rubber formulations into which the silicas of the present invention have been incorporated therefore have a better consistency. Formulations of this kind remain in the form in which they have been applied without showing any tendency to run. This was also confirmed by the viscosity values. Thus, the silicas of the present invention display equal or higher viscosity than the comparative examples.

The mechanical stability (tensile strength and tear propagation resistance) and also the flexibility (breaking extension) of the cured silicone rubber formulations can be assessed through their behavior under tensile load under different conditions (Table 4).

The results of measurement for the mechanical properties can be interpreted as follows: for the silicone rubber formulation 2c containing the silica of comparative example 2 it was not possible at all to produce silicone vulcanizates (complete curing directly after preparation), and accordingly it was not possible to measure the mechanical properties. The measurements for the formulations comprising the silica of Example 1 (of the present invention) show that the minimum requirements concerning the mechanical stability (tensile strength and tear propagation resistance) and also the flexibility (breaking extension) of the cured silicone rubber formulations were met. In comparison to comparative Example 1, the silica of the present invention exhibits better mechanical stability (higher values for tensile strength and tear propagation resistance) and also the same or better flexibility (equal or higher values for breaking extension).

The storage stability, i.e. the change in theological properties such as yield point and viscosity and also the negative cure behavior in the tube over time, is shown in Tables 5 and 6. Consideration was given here both to the storage at room temperature and to the storage at elevated temperature (50° C.). It is clearly apparent that the silicone rubber formulations comprising the silica of the present invention undergo no change, or no substantial change, in their theological properties, viscosity of 1/10 shear rate and Casson yield point over the storage period under investigation (namely 35 days). In other words, the effective thickening and processing properties (such as extrudability, for example) were still present even after storage under the stated conditions, without the sealant having undergone preliminary crosslinking or full vulcanization while still in the tube.

In contrast, for Comparative Example 1, in silicone rubber formulation 2b, a negative change in the rheological properties was observed within the first 21 days. In comparison to the initial values, the viscosity and yield point increase significantly, which points to premature crosslinking of the sealant. Between day 21 and day 28, the sample cures while still in the tube, and hence was no longer processable. The situation was similar after storage at elevated temperature. There, the premature curing of Comparative Example 1 occurs as early as between day 2 and day 7. Even worse was the precipitated silica Ultrasil® VN 3 (Comparative Example 2). Here, the silicone rubber 2c had cured immediately after preparation and can no longer even be dispensed into the cartridge (tube) and this silicone rubber compound was not suitable for RTV 1K applications. In both cases, the reason for this lies in the excessive moisture loading—expressed in terms of the equilibrium moisture content at 20° C./70% humidity—of the two comparison silicas, which initiates premature and rapid crosslinking of the silicone rubber. In contrast, as a result of the low moisture loading of the silicas of the present invention, it was possible to ensure long storage stability and hence also the processability, which can still be ensured even after such long storage.

TABLE 3

| Example | Silica used from | Loading [%] | Crosslinker content [g] | Stabilizer GE TP 3556 [g] | Casson Yield Point [Pa] | Viscosity at 10 1/s [Pa*s] |
|---|---|---|---|---|---|---|
| 2a | Example 1 | 12 | 42.0 | 8.0 | 90 | 102 |
| 2b | Comparative Example 1 | 12 | 42.0 | 8.0 | 13 | 102 |
| 2c | Comparative Example 2 | 12 | 42.0 | 8.0 | / | / |

TABLE 4

| Example | Silica used from | Loading [%] | Tensile strength [N/mm$^2$] | Tear propagation resistance [N/mm] | Breaking extension [%] |
|---|---|---|---|---|---|
| 2a | Example 1 | 12 | 3.4 | 12 | 652 |
| 2b | Comparative Example 1 | 12 | 2.5 | 11 | 590 |
| 2c | Comparative Example 2 | 12 | — | — | — |

TABLE 5

Rheology over 35 days at RT

| Example | Silica used from | Loading in [%] | Crosslinker content in [g] | Temp. in [° C.] | Period in [d] | Visc. at 10 1/s in [Pa*s] | Casson Yield Point in [Pa] |
|---|---|---|---|---|---|---|---|
| 2a | Example 1 | 12 | 42 | 23 | 0 | 103 | 90 |
|  |  |  |  |  | 35 | 108 | 89 |
| 2b | Comparative Example 1 | 12 | 42 | 23 | 0 | 102 | 13 |
|  |  |  |  |  | 21 | 173 | 77 |
|  |  |  |  |  | Preliminary crosslinking in the tube from day 22-28 | | |
| 2c | Comparative Example 2 | 12 | 42 | 23 | 0 | Completely crosslinked directly after preparation | |

TABLE 6

Rheology over 35 days at 50° C.

| Example | Silica used from | Loading in [%] | Crosslinker content in [g] | Temp. in [° C.] | Period in [d] | Visc. at 10 1/s in [Pa*s] | Casson Yield Point in [Pa] |
|---|---|---|---|---|---|---|---|
| 2a | Example 1 | 12 | 42 | 50 | 0 | 80 | 98 |
|  |  |  |  |  | 35 | 114 | 121 |
| 2b | Comparative Example 1 | 12 | 42 | 50 | 0 | 218 | 96 |
|  |  |  |  |  | Preliminary crosslinking in the tube from day 2-7 | | |
| 2c | Comparative Example 2 | 12 | 42 | 50 | 0 | Completely crosslinked directly after preparation | |

German patent application 102006024590.3 filed May 26, 2006, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A hydrophilic precipitated silica, having the following physicochemical parameters:

| | |
|---|---|
| Equilibrium moisture content (at 70% relative humidity/20° C.) | 0.5%-5.0% by weight, based on the weight of the hydrophilic precipitated silica; |
| BET surface area | 50-250 m$^2$/g; |
| CTAB surface area | 50-250 m$^2$/g; and |
| DBP (anhydrous) | 200-350 g/100 g, | wherein the silica has a pH of 4-6.5.

2. The silica of claim 1, having a modified tapped density of less than or equal to 70 g/l.

3. The silica of claim 1, having a silanol group density of 0.5 to 3.5 SiOH/nm$^2$.

4. The silica of claim 1, wherein 5% to 100% of particles in a volume-based particle distribution curve are <1 μm.

5. The silica of claim 1, having a d90 value of not greater than 0.01-10 μm.

6. The silica of claim 1, having a bimodal volume-based particle distribution curve.

7. The silica of claim 1, having a loss on ignition of 0.1%-3.0% by weight.

8. The silica of claim 1, having a loss on drying of 0.1%-3.0% by weight.

9. A process for preparing the silica of claim 1, comprising:
A) reacting at least one silicate with at least one acidifier, to obtain a silica;
B) filtering and washing the silica, to obtain a washed silica or filter cake;
C) drying the washed silica or filter cake, to obtain a dried silica; and
D) heat-treating the dried silica.

10. The process of claim 9, wherein the reacting A) comprises:
Aa) preparing an initial charge of i) water or of water and at least one silicate and/or a silicate solution;
Ab) metering i) at least one silicate and/or a silicate solution and ii) at least one acidifier into the initial charge from Aa) with stirring at 80 to 100° C. until a viscosity rise point is reached, to obtain a precipitation suspension;
Ac) stopping the addition of silicate and/or silicate solution and acidifier, and stirring the precipitation suspension at a temperature of 80 to 100° C. for a period of 15 to 120 minutes;
Ad) adding silicate and/or silicate solution so that the pH of the precipitation suspension is increased to 8 to 11 and, after the increased pH had been reached, stirring the precipitation suspension for a period of 15 to 90 minutes at this pH and at a temperature of 80 to 100° C.;
Ae) adding acidifier so that the pH of the precipitation suspension is lowered to 7 to 10;
Af) continuing the precipitation in accordance with Ab), adding i) silicate and/or ii) silicate solution and acidifier simultaneously at a temperature of 80 to 100° C. until the solids content of the precipitation suspension reaches a level which, after Ag) has been carried out, results in a desired solids content; and
Ag) adding an acidifier at a temperature of the precipitation suspension of 80 to 100° C., so that the pH of the precipitation suspension is lowered to 2 to 6 and the solids content of the precipitation suspension at the end of Ag) is between 30 and 70 g/l.

11. The process of claim 10, wherein, in Aa), the pH of the initial charge is between 5 and 10 and the temperature of the initial charge is between 80 and 100° C.

12. The process of claim 10, wherein, in Ae), the temperature remains the same as in Ad).

13. The process of claim 10, wherein, for the period of Ab), the pH is held constantly at a level between 7 and 10.

14. The process of claim 9, wherein the silicas are ground:
in a Ca), between C) and D); or
in a E), after D; or
both in Ca), between C) and D), and in E), after D).

15. The process of claim 14, wherein the grinding parameters are selected such that the size of ground product in the range <1 μm of the volume-based particle distribution has a fine-particle fraction of 5% to 100% and/or a d90 value in the volume-based particle distribution curve of between 0.01 and 10 μm.

16. The process of claim 9, wherein the heat treatment of the silica in D) is carried out in a fluidized-bed, fluid-bed, or rotary-tube reactor.

17. The process of claim 16, wherein a fluidized-bed reactor is employed and wherein the following are carried out:
Da) introducing the dried silica into the fluidized-bed reactor;
Db) preheating the reactor to 300 to 800° C., the reactor being traversed at the same time by a flow of inert gas and/or nitrogen/air mixture in such a way as to produce a fluidization velocity of 0.02 to 0.06 m/s;
Dc) feeding in a gas mixture I comprising steam and an inert gas, or a gas mixture II comprising steam, an inert gas and air, at 300 to 800° C. for a period of 0.25 to 6 h, the gas mixture traversing the reactor with a fluidization velocity of 0.02 to 0.06 m/s, and the gas mixtures I and II having a steam concentration of 10 to 95% by volume and in the case of gas mixture II an oxygen content of 0.01% to 21% by volume;
Dd) interrupting the addition of steam and expelling the steam with an inert gas, and/or with an inert gas/air mixture at 300 to 800° C., the gas or gas mixture traversing the reactor with a fluidization velocity of 0.02 to 0.06 m/s, and, if an inert gas/air mixture is employed, said mixture has an oxygen content of 0.01% to 21% by volume; and
De) cooling the heat-treated silica to room temperature in a dry process atmosphere, and, if an inert gas/air mixture is employed, said mixture has an oxygen content of 0.01% to 21% by volume.

18. A hydrophilic precipitated silica, obtained by the process of claim 10.

19. A sealant, comprising:
at least one silica of claim 1.

20. The sealant of claim 19, which is RTV-1K silicone rubber or a silicone sealant of at least one crosslinking system selected from the group consisting of an acetoxy-crosslinking system, an alkoxy-crosslinking system, and an oxime-crosslinking system.

21. A method of preparing a sealant, comprising:
adding at least one silica of claim 1 to a sealant.

22. The method of claim 21, wherein the sealant is RTV-1K silicone rubber or a silicone sealant of at least one crosslinking system selected from the group consisting of an acetoxy-crosslinking system, an alkoxy-crosslinking system, and an oxime-crosslinking system.

23. The sealant of claim 19, which is a joint-sealant suitable for a building application, an adhesive or sealant suitable for an automotive application, or as a coating material suitable for textile fabric.

* * * * *